(12) United States Patent
Rodriguez Llamazares et al.

(10) Patent No.: US 11,992,007 B2
(45) Date of Patent: May 28, 2024

(54) AQUEOUS FORMULATION THAT REDUCES DAMAGE CAUSED BY SPRING FROSTS IN PLANTS AND PRODUCTION METHOD THEREOF

(71) Applicants: UNIVERSIDAD DE CONCEPCION, Concepcion (CL); CENTRO DE INVESTIGACION DE POLIMEROS AVANZADOS, Concepcion (CL)

(72) Inventors: Saddys María Rodriguez Llamazares, Concepcion (CL); Constanza Sabando Correa, Concepcion (CL); Walther Ide, Concepcion (CL); Richard Mauricio Bastias Ibarra, Concepcion (CL)

(73) Assignees: UNIVERSIDAD DE CONCEPCION, Concepcion (CL); CENTRO DE INVESTIGACION DE POLIMEROS AVANZADOS, Concepcion (CL)

( * ) Notice: Subject to any disclaimer, the term of this patent is extended or adjusted under 35 U.S.C. 154(b) by 193 days.

(21) Appl. No.: 17/632,152

(22) PCT Filed: Aug. 11, 2020

(86) PCT No.: PCT/CL2020/050090
§ 371 (c)(1),
(2) Date: Feb. 1, 2022

(87) PCT Pub. No.: WO2021/026669
PCT Pub. Date: Feb. 18, 2021

(65) Prior Publication Data
US 2022/0312760 A1 Oct. 6, 2022

(30) Foreign Application Priority Data
Aug. 14, 2019 (CL) .................................. 2299-2019

(51) Int. Cl.
*A01N 25/10* (2006.01)
*A01N 3/00* (2006.01)
*C09D 129/04* (2006.01)

(52) U.S. Cl.
CPC ............... *A01N 25/10* (2013.01); *A01N 3/00* (2013.01); *C09D 129/04* (2013.01)

(58) Field of Classification Search
CPC ........ A01N 25/10; A01N 3/00; C09D 129/04; C08J 2329/04; C08J 3/03
See application file for complete search history.

(56) References Cited

U.S. PATENT DOCUMENTS 6,391,224 B1    5/2002   Wowk

OTHER PUBLICATIONS

Written Opinion for Corresponding International Application No. PCT/CL2020/050090 with English translation, dated Nov. 2, 2020 (17 pages).
C. Strubbs, et al; Multivalent presentation of ice recrystalization inhibiting polymers on nanoparticles retain activity; Langmuir; vol. 35, 2019; pp. 7347-7353.
M. Valenzuela, et al; PVA polymer as a tool to prevent frost damage on cherry *Prunus avium* L. flower buds; Chilean Journal of Agricultural & Animal Sciences (ex Agro-Ciencia); 2020; vol. 26. No. 2; pp. 97-109 (English abstract).
T. Inada, et al; Thermal hysteresis caused by non-equilibrium antifreeze activit of poly (vinyl alcohol); Chemical Physics Letters; 394; 2004; pp. 361-365.
C. Wang, et al; Foliar uptake of pesticides. Present status and future challenge; Pesticide Biochemistry and Physiology; 2007; 87; pp. 1-8.
M. Valenzuela, et al; Efectividad de la aplicacion de un agente crioprotector en el control del dano por heladas en cerezo (*Pranus avium* L.); Instituto de Investigacion de Ciencias Odontologicas; Oct. 2020; 44 pages.
International Search Report for Corresponding International Application No. PCT/CL2020/050090 dated Nov. 2, 2020 and English translation.

*Primary Examiner* — Zohreh A Fay
(74) *Attorney, Agent, or Firm* — LUCAS & MERCANTI, LLP

(57) ABSTRACT

An aqueous formulation that reduces the damage caused by spring frosts in plants having: (a) 0.001-2% by weight PVA micro/nanoparticles having a molecular weight of 10,000-100,000 g/mol and 1-20% acetate groups; (b) 0.0001-0.4% by weight stabilising agents; (c) 0.0005-0.05% by weight category IV adjuvants; (d) 0.00025-4% by weight emulsifier; (e) 0.003-6% by weight sodium hydroxide; and (f) 0.0065-13% by weight hydrochloric acid at 37% weight/weight and 1.18 g/mL density; a process for producing the aqueous formulation, and to uses.

6 Claims, 4 Drawing Sheets

AQUEOUS FORMULATION THAT REDUCES DAMAGE CAUSED BY SPRING FROSTS IN PLANTS AND PRODUCTION METHOD THEREOF

CROSS REFERENCE TO RELATED APPLICATION

This Application is a 371 of PCT/CL2020/050090 filed on Aug. 11, 2020, which claimed priority of Chilean Patent Application 2299-2019, filed Aug. 14, 2019, each of which are incorporated herein by reference.

FIELD OF THE INVENTION

The technology is oriented to the area of agriculture, more particularly, it corresponds to an aqueous formulation that reduces the damage caused by spring frosts in plants.

BACKGROUND OF THE INVENTION

Late or spring frost damage in temperate climates causes great economic losses in agriculture. For example, in the State of Florida, USA, the citrus industry has suffered crop and plantation losses of billions of dollars (ODEPA, 2010). This climatological event also affects Andean countries, thus in Chile it is estimated that losses due to the frosts of September 2013 were between US$600 to US$900 million and that the volume of exported fruit decreased between 15-20%. These estimates only refer to the economic loss for that season, as it is difficult to quantify losses due to physiological damage to the plants caused by the frost.

The magnitude of this damage depends fundamentally on: (i) intensity and duration of frost; (ii) concentration of active ice nucleating bacteria, known as INA; (iii) degree of hardening, related to plant adaptability to low temperatures, which decreases rapidly after warm periods; (iv) plant resistance to freezing; and (v) phenological stage of the plant. Thus, in deciduous fruit trees, damage increases from the initial bud development to the small fruit stage, where crops are more sensitive to frost.

In fruit trees, economic losses due to late frosts are not only caused by the loss or total loss of the crop due to deformed fruit, with partial or total rough or spotted rind, rotten fruit, but also to the physiological damage suffered by the trees. It should be considered that stone fruit species such as cherry, plum, peach, nectarine and almond are more susceptible to total crop loss, since the fruits normally lose their seed and are not able to maintain their parthenocarpic development.

The actual damage that can be caused by a spring frost is defined mainly by its magnitude (° C. below zero) and by its duration. As the temperature drops below 0° C., ice formation typically starts in the extracellular spaces of plants due to the fact that the extracellular fluid generally has a higher freezing point than intracellular fluid. Extracellular ice crystals damage the cell membrane by increasing the concentration of intracellular solutes (dehydration), alter the osmotic pressure across the cell membrane and by mechanical stress with the increase in the size of extracellular crystals (Saltveit and Morris, 1990). It is estimated that temperatures below 0° C. for 30 to 45 during the flowering and fruit set periods of fruit species would be sufficient to produce some type of damage to the reproductive structures of the plant.

Flower buds are the most affected by spring frosts, vegetative buds and young shoots usually withstand more, except in the most sensitive species in which the bud may die, resprouting a few days later by the lateral buds. During bud burst, the bud is more resistant than in the green bud stage (flower enveloped in sepals), and the latter more resistant than the state with the flower open (a state in which the gynoecium can be more easily affected, as it is less protected by the floral coverings). Maximum sensitivity occurs with the newly consolidated fruit. Once the fruit is formed, resistance increases with increasing fruit size (Sakai, 1987).

Existing methods to reduce spring frost damage are classified as active and passive. Active methods are applied at the beginning and during the occurrence of frost. Their main objective is to avoid heat loss from the soil and/or to actively influence plant temperature by means of external energy inputs. Examples of active methods are: inversion of air layers by mixing, with the help of large propellers, cold air close to the ground with warm air from higher atmospheric layers; interruption of radiation lost from the ground by using some kind of cover over the vegetation; increasing energy inputs to the air surrounding the plant or organ with some kind of cover over the vegetation; increasing energy inputs to the air surrounding the plant or organ with the help of burners; and spraying water on crops, with the plant taking advantage of the heat released by the change of state from liquid to solid (80 cal/g).

Among the passive methods are the selection of crop sites and cold-resistant plant species or varieties, and plant nutrition management, where the fertilizers added to the plants are controlled to prepare them before a frost, favoring the hardening and recovery of the tissues.

Cryoprotective agrochemicals are considered passive methods and are generally used by spraying before and during the frost season. In particular, these products have shown low effectiveness, less than 50%, although they directly favor the natural adaptability of plants to freezing (hardening), which decreases sharply at the beginning of the spring.

It should be considered that plant resistance to frost lies in maintaining the fluidity of the cell membrane during freezing and in tolerating the dehydration induced by the formation of extracellular ice crystals, which lead to the rupture of the cell membrane. To this end, the plant synthesizes dehydrins and antifreeze proteins, and reduces the amount of membrane localized receptors and carriers during the pre-hardening stage in late autumn.

Antifreeze proteins or antifreeze glycoproteins inhibit the formation of ice crystals by lowering the freezing point of water and reducing the formation of ice crystals by reducing the freezing point of water and also control the size, shape and aggregation of ice crystals (Hass-Roudsari et al., 2012). Antifreeze proteins produce three effects:
  i) thermal hysteresis, which corresponds to the difference between the point of freezing and the non-equilibrium melting temperature;
  ii) modification of ice crystal shape, resulting in hexagonal ice crystal morphologies; and
  iii) inhibition of ice recrystallization during thawing, in recrystallization when cryoprotective agents are not present, bulky crystals are formed at the expense of small crystals, which cause physical damage to the cell wall and facilitate the process of dehydration by osmotic difference.

The use of antifreeze proteins as cryoprotectants is technically unsustainable from an industrial point of view, since extraction from natural sources such as insect and fish blood generates a high environmental impact. These proteins are naturally found in very low concentrations and exert their activity in a non-colligative manner, making it very difficult to obtain the necessary critical mass of proteins to replicate it. Faced with this challenge synthetic antifreeze proteins or analogues with cryoprotective activity have been synthesized (Peltier et al., 2010; Congdon et al., 2013).

Macromolecules such as polyvinylpyrrolidone and polyvinyl alcohol (PVA) are known for their cryoprotective properties, specifically inhibitory activity of ice recrystallization, despite being structurally distinct from proteins. The mechanisms of action of polymeric macromolecules are not fully elucidated. However, most studies agree that the adhesion of macromolecules to the ice surface plays a preponderant role in the cryoprotective effect.

Several strategies have been studied to modulate or improve the cryoprotective properties of PVA. Commercial, atactic and fully hydrolyzed (98-99% grade) PVAs exhibit inhibitory activity of the ice recrystallization (IRI), similar to anti-freeze glycoproteins (Biggs et al., 2017). The molecular architecture and composition (molecular weight and distribution of OH and acetate groups) have been modified to improve the cryoprotective properties of PVA. In general, an increase in the molecular weight of PVA leads to an increase in IRI activity. However, the Linear PVA, branched PVA and star-shaped PVA have comparable IRI activities. Interestingly, the supramolecular structure of the PVA homopolymer modified with catechol end-groups and coordinating a $Fe^{3+}$ ($PVA:Fe^{3+}$ ratio of 1:0.33) increases the effectiveness in IRI activity of PVA (Phillips et al., 2016), suggesting that the hydrodynamic bulk of the PVA structure, e.g., in the form of micro/nanoparticles of this biomimetic polymer, plays an important role in IRI.

Some documents related to this technology are listed below:

1.—Effect of Polyvinyl Alcohol on Ice Formation in the Presence of a Liquid! Solid Interface" (Zhu et al.); *Langmuir* 33(1): 191-196, 2016. It is pointed out that ice formation is of great importance in biological systems and in some technological applications, and that it has been shown that many synthetic polymers affect ice formation, in particular PVA. This study aims to understand this already described process. Colloidal silica (CS) was introduced as a model liquid-solid interface and the effect of PVA on ice formation was studied in detail. The results showed that both PVA and CS promoted ice formation, while the mixture thereof (CS-PVA) prevented their formation (antifreeze). The main contribution comes from the kinetic factor rather than the energy barrier factor. The combination of the adsorption behavior of PVA on CS particles suggests that PVA adsorption at the interface reduces ice nucleation, which may provide new insights for the development of cryoprotective agents.

2.—"The Synthesis of High Molecular Weight Partially Hydrolyzed Poly(vinyl alcohol) Grades Suitable far Nanoparticle Fabrication" (Ghana, Jasminder et al.), *Journal of Nanoscience and Nanotechnology*, 8(11): 5739-5747, 2008. It discloses that PVA is a versatile synthetic polymer that is formed by total or partial hydrolysis of poly(vinyl acetate) (PVAc). This study focuses on partially hydrolyzed PVA in the range of 30-60%. They synthesized amphiphilic grades of PVA at laboratory scale, analyzed their chemical properties, and determined whether these grades could be used to form nanoparticles. PVA 30%, PVA 40%, PVA 50% and PVA 60% by direct saponification of PVAc. All grades of PVA formed nanoparticles using a precipitation technique, with a trend toward smaller particle size with increasing degree of PVA hydrolysis; PVA 30% resulted in significantly larger nanoparticles (225 nm) compared to PVA 40-60% (137-174 nm).

3.—Preparation of monodisperse poly(vinyl alcohol) (PVA) nanoparticles by dispersion polymerization and heterogeneous surface saponification" (Lee, Y. et al.), *Fibers and Polymers* 17(4): 502-511, 2016 A preparation with a uniform size distribution of monodisperse poly(vinyl alcohol) (PVA) nanoparticles is described. PVA/poly(vinyl acetate) (PVAc) by saponification of PVAc. Vinyl acetate (VAc) was dispersion polymerized in a solvent mixture of ethanol and water. As the amount of ethanol in the medium increased, the resulting PVAc nanoparticle size increased. To determine the alkaline solution concentration for heterogeneous saponification, monodisperse PVAc nanoparticles were saponified at different concentrations at 25° C. for 0.5-3.0 h. The PVA/PVAc nanoparticles, obtained by heterogeneous saponification with 4% alkaline solution, were uniform and star-shaped in size distribution, with diameters ranging from 428-615 nm. Transmission electron microscopy confirmed the spherical and regular nature fo the core/Shell structure of PVA/PVAc nanoparticles.

4.—U.S. Pat. No. 6,391,224 (Wowk): "Polyvinyl alcohol compounds far inhibition of ice growth". PVA and similar compounds are disclosed for inhibition of freezing of water and aqueous solutions. Concentrations ranging from 0.01% to 10% w/w with hydrolysis of 80 to 97% and molecular weight less than 30 kDa are preferred; or PVA oligomers such as: 1, 3, 5, 7 heptanetetrol and homologues, are active as freeze inhibiting compounds, and where the PVA is composed of between land 25% of vinyl acetate.

5.—U.S. Pat. No. 3,399,991 (Clarence): "Freeze resistant pesticide/composition". It refers to the use of freeze resistant pesticide substrates. Its composition is 20 to 50% powdered pesticide, 0.15 to 1.5% low viscosity methylcellulose, 0.1 to 2.5% polyvinyl alcohol, partially desulfurized lignin sulfate or polymerized alkaryl sulfonate, and 46 to 79.8% in aqueous solution of ethylene glycol or propylene glycol in which the glycol:water ratio is 2:1 to 1:23.

Based on this background, there is still a need to find alternatives to modulate the formation and growth of ice, and with this, inhibiting the recrystallization of extracellular ice, thus mitigating the damage caused by spring frosts on plants.

DETAILED DESCRIPTION OF THE INVENTION

Figure 1:
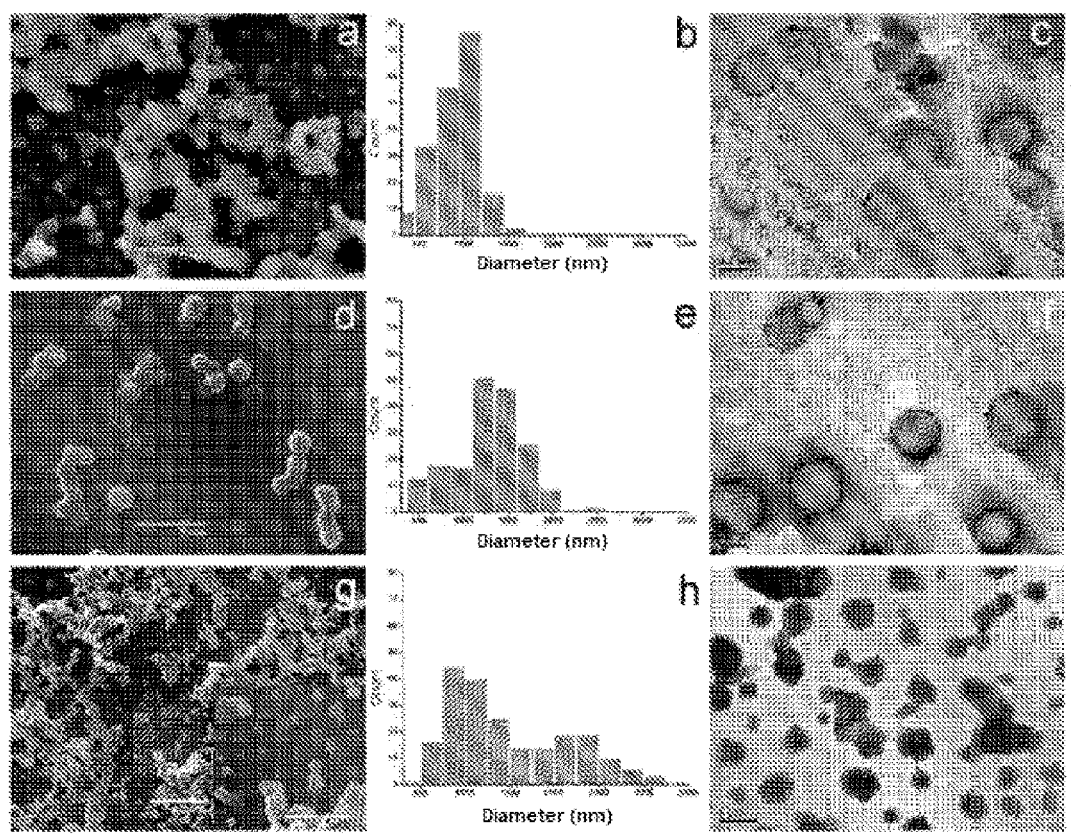
FIG. 1: corresponds to scanning electron microscopy images (a, d and g), histograms from scanning microscopy (b, e and h) and transmission electron microscopy images of PVA micro/nanoparticles obtained from PVA of different weight-average molecular weight (c, f and i); where: (a), (b) and (c) correspond to L-PVA micro/nanoparticles; (d), (e) and (f) m-PVA amicro/nanoparticles; and (g), (h) and (i) to h-PVA micro/nanoparticles.

The present technology corresponds to an aqueous formulation whose active ingredient is a biomimetic solute that reduces plant damage caused by spring frosts. This formulation contains micro/nanoparticles of PVA, a biomimetic polymer with frost recrystallization inhibitory activity, which achieves plant protection, regardless of the phenological state, in conditions of up to −5° C. and for 4 hours.

Specifically, the aqueous formulation comprises at least the following components:

a. 0.001-2% by weight of PVA micro/nanoparticles, whose molecular weight fluctuates between 10,000-100,000 g/mol and the percentage of acetate groups between 1 and 20%;

b. 0.0001-0.4% by weight of stabilizing agents such as polyvinylpyrrolidone and/or nonionic surfactants such as tween;

c. 0.0005-0.05% by weight of category IV commercial adjuvants such as Induce pH® which acts as a buffer or stopper when diluting the formulation concentrate;

d. 0.00025-4% by weight of emulsifier such as soy lecithin to enhance formulation adhesion;

e. 0.003-6% by weight of sodium hydroxide forming agent for PVA micro/nanoparticles;

f. 0.0065-13% by weight of Hydrochloric acid (37% w/w and 1.18 density g/ml) as neutralizing agent.

The formulation based on PVA nanoparticles is obtained through a precipitation or alkaline treatment process, which comprises at least the following steps:

a. dissolution of PVA: PVA must be dissolved in water in at least a 1/50 ratio in a mineral bath and with temperatures fluctuating between 40-100° C., depending on the molecular weight and degree of hydrolysis of the PVA and for at least 2 hours, using agitation with speeds between 500-900 rpm.

b. dissolution: sodium hydroxide must be dissolved in water at room temperature (20° C.), using agitation with speeds between 500-900 rpm and concentrations fluctuating between 2-8% weight/volume;

c. mixing: the solution obtained in step (a) is mixed in a reactor containing a solution of step (b) in at least one ratio of 1/1, by dripping using a peristaltic pump with speeds fluctuating between 10-50 ml/hr. During mixing, agitation is used with speeds between 700-8000 rpm. At this stage micro/nanoparticles of PVA are obtained whose size fluctuates between 300-3000 nm;

d. neutralization: the dispersion obtained in step (c) is neutralized with hydrochloric acid (37% w/w and 1.18 density g/ml) up to pH=7, using agitation at speeds between 100-300 rpm; and e. mixing of stabilizers, emulsifiers and/or coadjuvants: the dispersion obtained in step (d) is mixed in a reactor with the different stabilizers, emulsifiers and/or coadjuvants in at least one 1/10 ratio at room temperature, using stirring speeds between 4000-8000 rpm.

Advantageously, this formulation allows:

inhibit ice recrystallization at concentrations greater than and equal to 0.01% w/v of PVA micro/nanoparticles;

reduce frost damage to flower buds of stone fruit trees by 20% with respect to water; and do not cause damage to the harvested fruit, nor to the fruit during post-harvest.

APPLICATION EXAMPLES

Example 1. Preparation of an Aqueous Formulation of PVA Micro/Nanoparticles and Evaluation of their Properties Fully hydrolyzed PVA of three different weight-average (Mw) molecular masses ($M_w$=13000-23000 g/mol, $M_w$=31000-50000 g/mol and $M_w$=89000-98000 g/mol) were dissolved in nanopure water using a natural oil bath and under a magnetic stirrer at 100° C. for about 2 h. A 2% w/v solution was added dropwise to a 6% w/v sodium hydroxide solution at a rate of 30 ml/h using a syringe pump (TE 331, Terumo, Japan) and under constant stirring at 700 rpm. The ratio of PVA:NaOH solution was 1:1. The dispersion was then neutralized with hydrochloric acid (37% w/w and density of 1.18 g/mL). The samples were labeled according to the molecular mass of the PVA. Thus, the L-PVA label corresponded to the low Mw (13000-23000 g/mol) PVA micro/nanoparticle dispersion, the m-PVA label to the medium Mw (31000-50000 g/mol) PVA micro/nanoparticle dispersion and the h-PVA label to the medium Mw (31000-50000 g/mol) PVA micro/nanoparticle dispersion and the h-PVA label to the medium Mw (31000-50000 g/mol) PVA micro/nanoparticle dispersion. PVA micro/nanoparticles dispersion of high Mw. (89000-98000 g/mol).

The obtained PVA micro/nanoparticles were evaluated by the following assays:

a.—Scanning Electron Microscopy (SEM):

The morphology and size of PVA micro/nanoparticles before and after neutralization were analyzed using a JEOL-JSM 6380LV (Tokyo, Japan) scanning electron microscope operated at 20 kV. A droplet of PVA micro/nanoparticle dispersion was dried at room temperature and coated with a gold film (50 nm). The magnifications were 2000×, 5000× and 10000×. The microscopy images can be seen in the FIG. 1, where (A), (D) and (G) correspond to micro/nanoparticles of L-PVA; (B), (E) and (H) correspond to micro/nanoparticles of m-PVA; and (C), (F) and (I) correspond to h-PVA micro/nanoparticles.

Alkaline treatment to the aqueous PVA solution produces particles of spherical shape as can be seen in FIGS. 1 A, B and C. The size of these PVA micro/nanoparticles was measured directly from SEM micrographs, using ImageJ software, and size distribution plots were constructed from at least 190 particles (see FIGS. B1, E and H). The average size of the PVA micro/nanoparticles was 900±300, 1300±400, 1500±700 nm for L-PVA, m-PVA and h-PVA samples, respectively. The mean particle size increased significantly (Tukey's test, α=0.05) with increasing PVA molecular weight. The m-PVA and h-PVA micro/nanoparticles size distributions were broader than those corresponding to L-PVA nanoparticles. In general, the h-PVA particle samples showed higher amount of chain-like aggregates of the spherical micro/nanoparticles (see FIGS. 1C, F and I).

The effect of the molecular weight of PVA on the average size of the micro/nanoparticles can be explained by taking into account that: at the 1% w/v concentration, the ball was formed by a single chain (Budhlall et al., 2003), and that the distance between the chains of fully hydrolyzed PVA was relatively short, due to the competition between the polymer-solvent and polymer-polymer interactions (Mansur et al., 2008). The addition of the aqueous PVA solution to the NaOH solution decreased the solubility of PVA, as the hydration of $Na^+$ and $OH$ ions reduces the number of free water molecules available to interact with PVA. As a result, the polymer-polymer interaction was dominant, and the PVA single tangle chains tended to coalesce, forming a spherical-shaped micellar structure. Therefore, the size of this micellar structure depends on the degree of polymerization of the component PVA chains. It is proposed that the micro/nanoparticles were stabilized by electrostatic repulsion of their negative charges, probably due to the absorption of free OH groups on the PVA particles by hydrogen bridge interactions, as can be deduced from the FTIR infrared spectroscopy results. The change in the dielectric environment of the PVA micro/nanoparticles by the addition of HCl led to a pseudo-linear arrangement of micro/nanoparticles, as can be observed in the SEM images.

b.—Transmission Electron Microscopy (TEM):

This test was performed on a JEOL/JEM1200 EX transmission microscope II (USA) operated up to 120 kV. A drop of a dilute dispersion of PVA micronanoparticles before and after neutralization was placed on a carbon-coated Cu grid (G200 Hex) and then air-dried.

FIGS. 1 (C, F and H) shows the transmission electron microscopy images of the micro/nanoparticles obtained from PVA of different weight-average molecular weights, where it is observed that the neutralized particles were coated by sodium chloride crystals, suggesting the interaction of sodium hydroxide with the PVA chains.

c.—Fourier Transform Infrared Spectroscopy (FTIR):

The FTIR spectra of the PVA micro/nanoparticles and PVA macro molecules were recorded in triplicate in a Perkin Elmer Spectrum Two FTIR (USA) spectrophotometer, in the range of 600-4000 $cm^{-1}$ to 4 $cm^{-1}$ of resolution. The FTIR spectrum was taken with attenuated total internal reflectance (ATR). The spectrum is shown in transmittance mode. Baseline correction of the spectrum was performed using Spectral Manager software, versión 2. The data were processed according to Pozo et al. (2018), using the Origin software, version 8.6.

Figure 2:
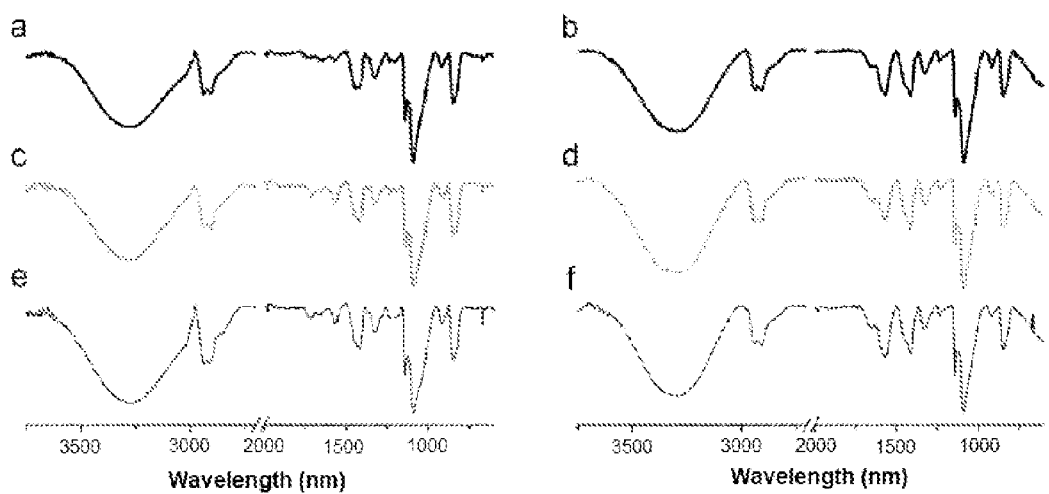
FIG. 2: corresponds to FTIR spectra of PVA macromolecules of different weight-average molecular weight (a, c and e) and PVA micro/nanoparticles (b, d and f), where: (a) and (b) corresponds to L-PVA; (c) and (d) to m-PVA; and (e) and (f) to h-PVA.

The FTIR spectra of PVA micro/nanoparticles and PVA precursors are shown in FIG. 2. The spectra show peaks characteristic of PVA (Awada and Daneault, 2015). The broad band between 3100-3400 $cm^{-1}$ is assigned to the stretching vibrations of OH groups. The symmetric vibration and asymmetry of the $CH_2$ groups is observed at 2910 and 2942 $cm^{-1}$, respectively. The peaks around 840 and 1420 $cm^{-1}$ are associated with in-plane bending and stretching vibrations, respectively, of the $CH_2$ group. The most intense peak at 1080 $cm^{-1}$ corresponds to C—OH stretching in aliphatic alcohols. As expected, the vibrations associated with C=O of the acetate group around 1715 $cm^{-1}$ is observed at lower intensity for PVA precursors with high hydrolyzed degree (98-99%). The band at 1142 $cm^{-1}$ is attributed to the C—O—C stretching vibration and is related to the crystallinity of PVA. This band was similar for both the PVA macromolecule and the PVA micro/nanoparticles, suggesting that no increase in crystallinity increases in crystallinity upon formation of PVA micro/nanoparticles.

The main differences between the spectra of the PVA micro/nanoparticles and the PVA precursors are the absence of bands between 1735-1750 $cm^{-1}$ and the presence of a new band at 1647 $cm^{-1}$ in the spectra of the micro/nanoparticles of PVA. The absence of bands in the region between 1735-1750 $cm^{-1}$ accounts for the fact that PVA was completely hydrolyzed during the alkaline treatment. The band at 1647 $cm^{-1}$ was attributed to the out-of-plane bending vibration or the result of δ(HOH), which is influenced by bridging-type hydrogen bonds. The δ(OH) band at wave number higher at 1645 $cm^{-1}$ indicates a high proportion of bridging hydrogen bonds in the PVA microparticles.

d.—Splash Cooling Test:

IRI activity was assessed using a method adapted from Knight et al (1988). A drop of 10 μL was dropped from a height of 1.85 m onto a microscope slide, previously cooled for 1 h with dry ice. Then, the slide was rapidly transferred to the Peltier LTS120 system (Linkam, UK) attached to the Olympus BX43 microscope (Japan) and kept at −6° C. for 1 h. The recrystallization process was followed during thawing at −6° C. using a polarizer for transmitted light (U-POT). Images were collected using an Olympus SC50 video camera at 10× magnification. A NaCl solution was used as a negative control at different concentrations and NaCl was also added to the precursor PVA solution to better distinguish the ice crystal outline. The NaCl concentration selected was equal to that present in the PVA micro/nanoparticles, except for the PVA macromolecules at 1% w/v, where a lower concentration of NaCl 0.137 mol/L was used (Biggs et al. 2019), due to the insolubility of the macromolecule in a 0.7 mol/L NaCl solution. The ice crystal size before (zero time) and after (1 hr) keeping the PVA samples at −6° C. was compared to determine the ice recrystallization inhibition activity of PVA micro/nanoparticles with respect to PVA precursors.

Figure 3:
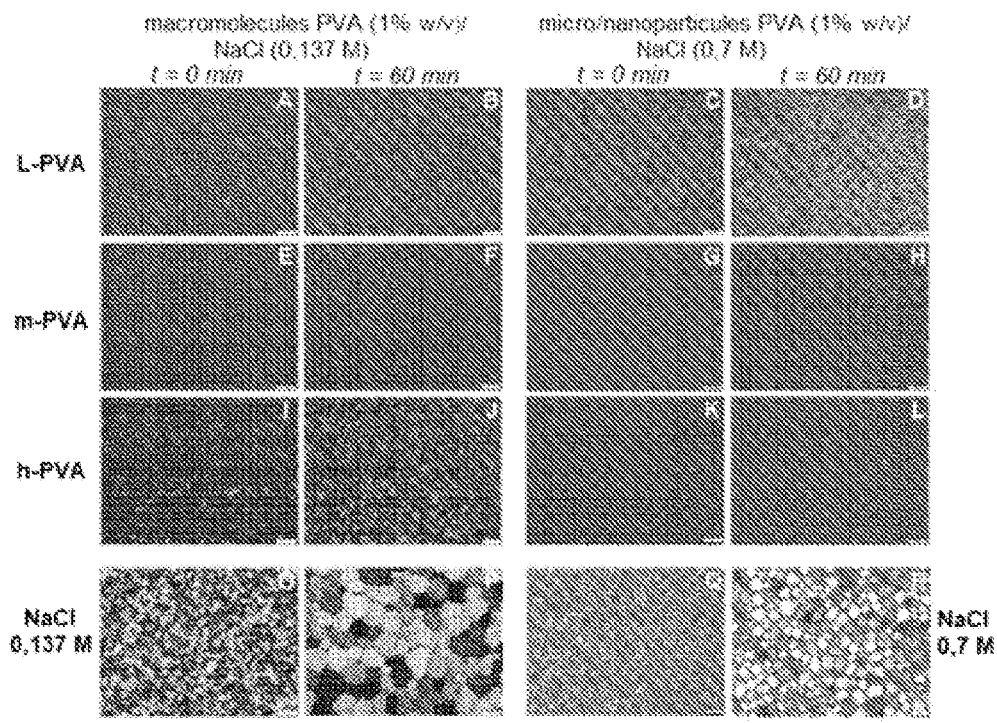
FIG. 3: corresponds to optical microscopy images of a frozen drop of water containing: PVA solution of different weight average molecular weight at 1.0 wt % w/v (A, B, E, F, I and J); PVA micro/nanoparticles dispersion 1.0 wt % w/v (C, D, G, H, K and L) and NaCl solution at 0.137 mol/L (O and P), and at 0.7 mol/L (Q and R) at zero time (A, E, I, O, C, G, K and Q) and at 60 min (B, F, J, P, D, H, L and R) of maintaining the samples at −6° C.; where: (A), (B), (C) and (D) correspond to L-PVA; E, F, G and H to m-PVA; and (I), (J), (K) and (L) to h-PVA.
Figure 4:
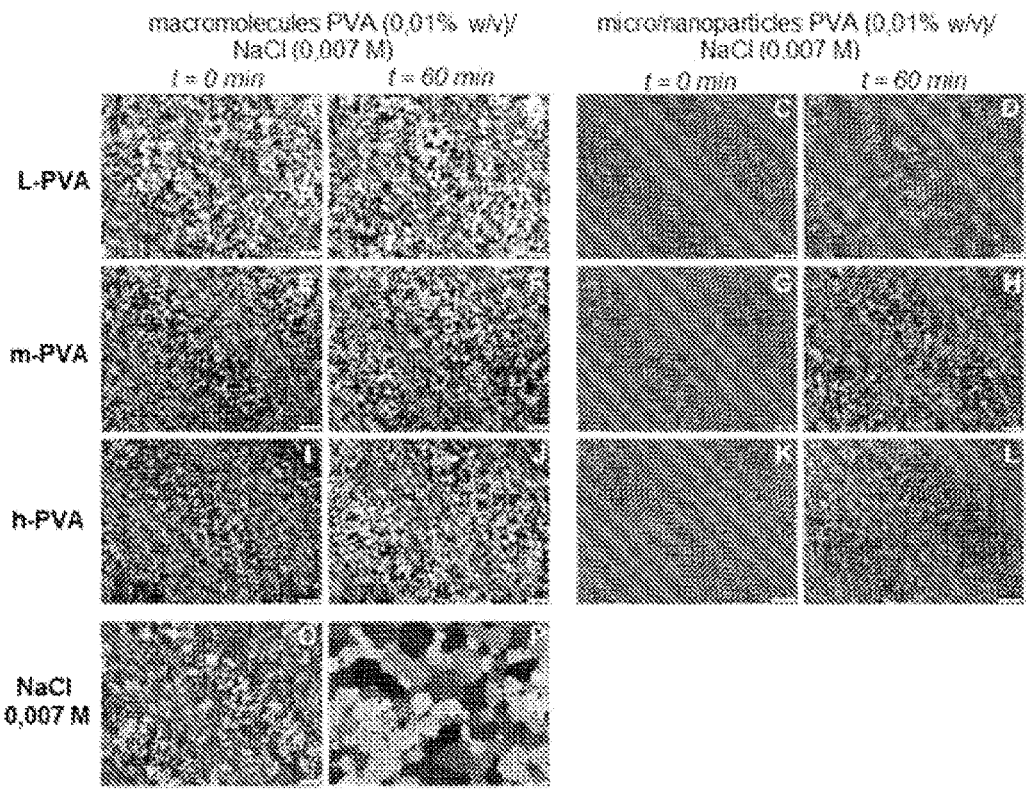
FIG. 4: corresponds to 1 optical microscopy images of a frozen drop of water containing: PVA solution of different weight average molecular weight at 0.01% w/v (A, B, E, F, I and J) and PVA micro/nanoparticles dispersion 0.01% w/v (C, D, G, H, H, K and L) and NaCl solution at 0.07 mol/L (O and P), at zero time (A, E, I, O, C, G and K) and at 60 min (B, F, J, P, D, H and L) of keeping the samples at −6° C.; where: (A), (B), (C) and (D) correspond to L-PVA; (E), (F), (G) and (H) to m-PVA; and (I), (J), (K) and (L) to h-PVA.

FIGS. 3 and 4 show the evolution of ice crystals for samples with PVA micro/nanoparticles and for the precursor PVA macromolecules at two concentrations: 1% w/v (FIG. 3) and 0.01% w/v (FIG. 4). The ice crystal sizes increased over time in NaCl solution of different concentrations. Precursor PVA solutions of different molecular weights and PVA micro/nanoparticle dispersions showed smaller crystal sizes at min 60 and at −6° C. compared to NaCl solution, despite the fact that the 1% w/v PVA solution was more stable than the NaCl solution had the same NaCl concentration as the negative control. The PVA micro/nanoparticle dispersions exhibited higher IRI activity than the precursor PVA solutions. This is explained by the hydrodynamic bulk presented by the PVA particles when adsorbed on the ice surface, which prevents adjacent ice crystals from bonding to form a larger one (Knight et al., 1995). Furthermore, it is observed that as the molecular weight of PVA increases, the degree of ice recrystallization inhibition was higher, which supports our theory.

e.—Evaluation of the Cryoprotectant Properties of PVA Micro/Nanoparticles on Fruit Trees.

The cryoprotective properties of PVA micro/nanoparticles on fruit trees were evaluated by microchamber test and field trial:

e.1.—Microchamber Test:

The microchamber trial consisted of placing naked cherry darts of different phenological stages in a cold chamber and applying different products to inhibit frost damage. The darts of 4-5 cherry buds of the Sweethearr variety were placed in a plastic tray with hydrated cotton. The bracts of each bud were then stripped to expose the inner tissue to low temperatures. The darts were sprayed with different products: water, 0.1% w/v PVA solution, 0.01% w/v h-PVA micro/nanoparticle dispersion or commercial cryoprotective agrochemical, and immediately placed in a micro-chamber at $-5°$ C. and 70% relative humidity for a period of 4 hours.

Figure 5:
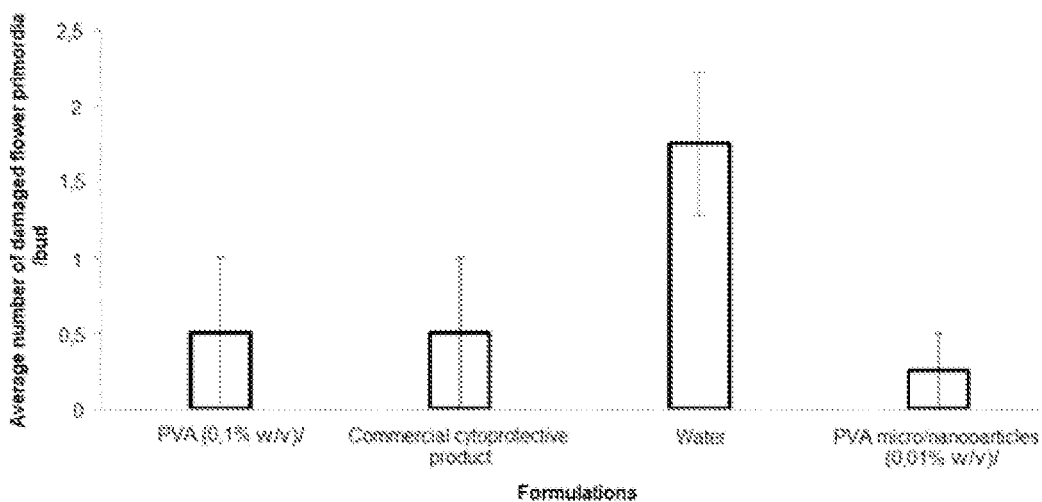
FIG. 5: corresponds to the microchamber tests on the effect of the application of different products (water, PVA solution, micro/nanoparticle dispersion and commercial cryoprotectant) on the incidence of frost damage in flower primordia under simulated frost conditions (−5° C. for 4 h); the values represent the average of different phenological stages.

The phenological stages tested were: bud recess, swollen bud and bud burst. The FIG. 5 shows the effect of the application of the different products on the incidence of frost damage in flower buds in the microchamber test, where the most effective product was the dispersion of micro/nanoparticles of PVA at 0.01% w/v. This formulation reduced the incidence of frost damage on flower primordia by about 10% with respect to the control (water).

e.2.—Field Test:

Field trials were conducted during the 2018-2019 season in a commercial cherry orchard of the Sweetheart cultivar. The Sweetheart cultivar orchard consisted of nine-year-old trees grafted on the Colt rootstock and planted at a distance of 4.5×3 m. As experimental unit, four branches per tree were selected to which hydrogenated cyanamide (Dormex®, Trostberg, Germany) was applied in the bud break period (July 2018) at a dose of 2% v/v together with a concentrated soluble adjuvant (Break®, Hopewell, USA) at a dose of 0.01% v/v. The experiment was planned in a completely randomized block design with four replications (trees).

The products applied were: water, 0.1% w/v PVA solution, 0.01% w/v h-PVA micro/nanoparticle dispersion and commercial cryoprotectant agrochemical. Applications were made at the phenological stages of: bud recess, swollen bud, green button and flowering; and before a frost event. Applications of hydrogenated cyanamide and the products were made through a manual motorized sprayer (SWISSMEX®, Jalisco, Mexico) with a 15 L capacity.

Figure 6:
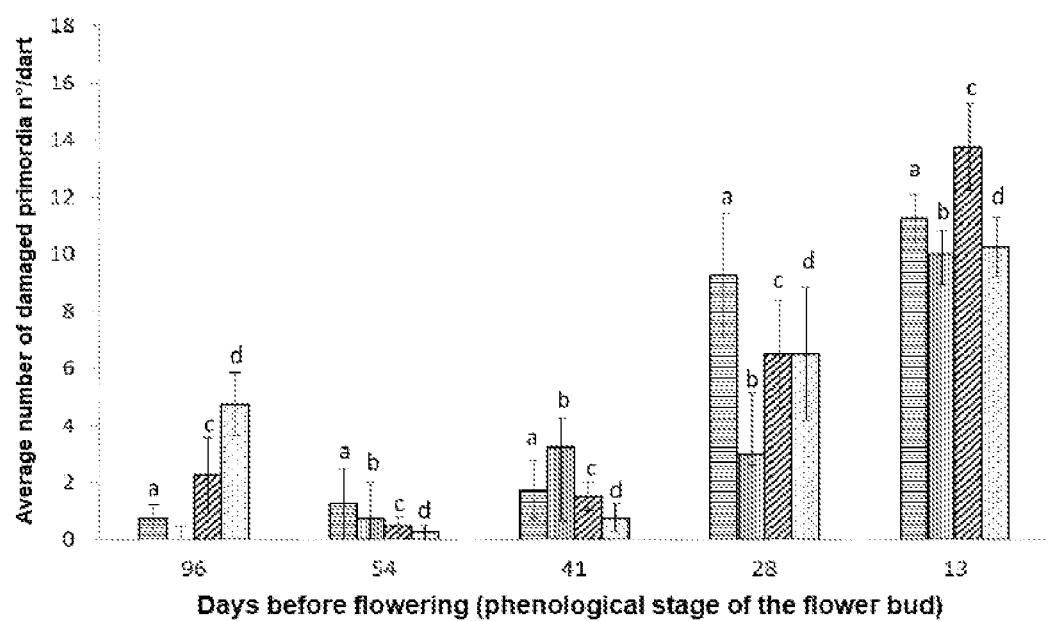
FIG. 6: corresponds to the results of the field trial expressed in flower primordium damage at the phenological stages of: receding bud, swollen bud, green button and flowering when applying the different products (water, PVA solution, micro/nanoparticle dispersion and commercial cryoprotectant); where (a) corresponds to PVA solution at 0.1% w/v; (b) to PVA micro/nanoparticle dispersion (0.01% w/v), (c) to commercial cryoprotectant agent and (d) to water.

In the 2018-2019 season, the number of accumulated hours with temperatures below 0° C. exceeded 200 hours in the locality where the commercial orchard under study is located. In this case, the 0.01% w/v PVA micro/nanoparticle formulation reduced the amount of damaged flower primordia in buds by 85% (FIG. 6). For this product, the number of damaged flower primordia per dart was lower at all phenological stages, except at 54 and 41 days before flowering (recessing bud stage), at 54 and 41 days before flowering (recessing bud stage). The formulation with micro/nanoparticles was used in the formulation with micro/nanoparticles in the formulation with micro/nanoparticles in the formulation with micro/nanoparticles in the formulation with micro/nanoparticles. The formulation with dispersed PVA micro/nanoparticles was 45% more effective in reducing the incidence of damage compared to the commercial antifreeze.

Finally, these trials demonstrated that the PVA nanoparticle-based formulation can reduce frost damage to plants.

The invention claimed is:

1. An aqueous formulation that reduces spring frost damage to plants wherein it comprises at least the following components:
    i. 0.001-2% by weight of polyvinyl alcohol (PVA) micro/nanoparticles of molecular weight between 10,000-100,000 g/mol and percentage of acetate groups between 1 and 20%;
    ii. 0.0001-0.4% by weight of stabilizing agents;
    iii. 0.0005-0.05% by weight of adjuvants;
    iv. 0.00025-4% by weight of emulsifier;
    v. 0.003-6% by weight of sodium hydroxide; and
    vi. 0.0065-13% by weight of hydrochloric acid, wherein the % weight is based on the hydrochloric acid at 37% w/w and 1.18 density g/ml of the hydrochloric acid.

2. The aqueous formulation that reduces spring frost damage to plants according to claim 1, wherein the stabilizing agent is polyvinylpyrrolidone and/or nonionic surfactants.

3. The aqueous formulation that reduces spring frost damage in plants according to claim 1, wherein the emulsifier is soy lecithin.

4. A process for producing the aqueous formulation of claim 1 comprising the following steps:
    a. dissolving polyvinyl alcohol (PVA) in water in at least a 1/50 ratio in a mineral bath and with temperatures fluctuating between 40-100° C., depending on the molecular weight and degree of hydrolysis of the PVA and for at least 2 hours, using agitation with speeds between 500-900 rpm;
    b. dissolving sodium hydroxide in water at room temperature (20° C.), using agitation with speeds between 500-900 rpm and concentrations fluctuating between 2-8% weight/volume;
    c. obtaining PVA micro/nanoparticles: the solution obtained in stage "a" is mixed in a reactor containing the solution of stage "b" in a 1/1 ratio, by dripping using a peristaltic pump with a flow rate of 10-50 ml/h and using agitation with speeds between 700-8000 rpm, to obtain PVA micro/nanoparticles whose size varies between 300-3000 nm;
    d. neutralizing the dispersion obtained in step "c" with hydrochloric acid up to pH 7, using agitation with speeds between 100-300 rpm; and
    e. mixing the neutralized dispersion in a reactor with stabilizers, emulsifiers and/or adjuvants in a 1/10 ratio at room temperature, using agitation with speeds between 4000-8000 rpm.

5. A method of inhibiting recrystallization of ice in plants comprising applying the aqueous formulation of claim 1 to the plant to inhibit recrystallization of ice.

6. A method of reducing damage in plants comprising applying the aqueous formulation of claim 1 to the plant to reduce damage in conditions of frosts down to $-5°$ C. and for 4 hours.

* * * * *

UNITED STATES PATENT AND TRADEMARK OFFICE
CERTIFICATE OF CORRECTION

PATENT NO. : 11,992,007 B2
APPLICATION NO. : 17/632152
DATED : May 28, 2024
INVENTOR(S) : Saddys María Rodriguez Llamazares et al.

It is certified that error appears in the above-identified patent and that said Letters Patent is hereby corrected as shown below:

In the Specification

Column 3, Line 25, "Linear PVA" should read --linear PVA--.

Column 3, Line 37, "a Liquid!Solid Interface" should read --a Liquid/Solid Interface--.

Column 3, Line 56, "(Ghana, Jasminder et al.)" should read --(Chana, Jasminder et al.)--.

Column 4, Line 3, "Preparation of" should read --"Preparation of--.

Column 4, Line 7, "2016 A" should read --2016. A--.

Column 4, Line 21 to 22, "nature fo the core/Shell" should read --nature of the core/shell--.

Column 4, Line 31, "between 1and 25%" should read --between 1 and 25%--.

Column 4, Line 54, "m-PVA amicro/nanoparticles" should read --m-PVA a micro/nanoparticles--.

Column 5, Line 4, "to 1 optical" should read --to optical--.

Column 5, Line 46, "between land 20%;" should read --between 1 and 20%;--.

Column 5, Line 57, "Hydrochloric acid" should read --hydrochloric acid--.

Column 5, Line 58, "1.18 density g/ml" should read --1.18 density g/mL--.

Column 6, Line 8, "10-50 ml/hr." should read --10-50 mL/hr.--.

Column 6, Line 14, "density g/ml" should read --density g/mL--.

Signed and Sealed this
Twelfth Day of November, 2024

Katherine Kelly Vidal
*Director of the United States Patent and Trademark Office*

CERTIFICATE OF CORRECTION (continued)
U.S. Pat. No. 11,992,007 B2

Column 6, Line 43, "rate of 30 ml/h" should read --rate of 30 mL/h--.

Column 7, Line 9, "(see FIGS. B1, E and H)" should read --(see FIGS. 1 B, E and H)--.

Column 7, Line 18, "(see FIGS. 1C, F and I)." should read --(see FIGS. 1 C, F and I).--.

Column 7, Line 31, "single tangle chains" should read --single ball chains--.

Column 7, Line 57, "macro molecules" should read --macromolecules--.

Column 7, Line 63, "versio´n 2." should read --version 2.--.

Column 9, Line 14, "the Sweethearr" should read --the 'Sweetheart'--.

Please delete the following paragraph from Column 9, Line 59 to Column 10, Line 1, "The formulation with micro/nanoparticles was used in the formulation with micro/ nanoparticles in the formulation with micro/nanoparticles in the formulation with micro/nanoparticles in the formulation with micro/nanoparticles.".